(12) United States Patent
Allen et al.

(10) Patent No.: US 7,676,751 B2
(45) Date of Patent: Mar. 9, 2010

(54) SYSTEM AND METHOD FOR PROCESSING APPLICANT INPUT INFORMATION

(75) Inventors: Brian J. Allen, Machesney Park, IL (US); Bruce A. Buroker, Elgin, IL (US); John P. Flood, Bartlett, IL (US); Scott A. Gentz, Oregon, IL (US); Gina M. Lidman, Schaumburg, IL (US); William J. Teichman, Harleysville, PA (US)

(73) Assignee: JPMorgan Chase Bank, NA, New York, NY (US)

( * ) Notice: Subject to any disclaimer, the term of this patent is extended or adjusted under 35 U.S.C. 154(b) by 1285 days.

(21) Appl. No.: 10/889,176

(22) Filed: Jul. 13, 2004
(Under 37 CFR 1.47)

(65) Prior Publication Data

US 2004/0243641 A1 Dec. 2, 2004

Related U.S. Application Data

(63) Continuation of application No. 09/597,298, filed on Jun. 20, 2000, now Pat. No. 6,867,789.

(60) Provisional application No. 60/182,674, filed on Feb. 15, 2000.

(51) Int. Cl.
*G06F 3/00* (2006.01)
(52) U.S. Cl. ..................... 715/744
(58) Field of Classification Search ............ 715/738, 715/740, 744, 745, 746, 734, 735, 736, 771
See application file for complete search history.

(56) References Cited

U.S. PATENT DOCUMENTS

| | | | |
|---|---|---|---|
| 4,696,491 A | 9/1987 | Stenger | |
| 4,801,787 A | 1/1989 | Suzuki | |
| 5,233,654 A | 8/1993 | Harvey et al. | |
| 5,534,855 A | 7/1996 | Gajnak et al. | |
| 5,570,295 A | 10/1996 | Isenberg | |
| 5,576,951 A | 11/1996 | Lockwood | |
| 5,583,778 A | 12/1996 | Wind | |
| 5,592,560 A | 1/1997 | Deaton | |
| 5,602,936 A | 2/1997 | Lynn et al. | |
| 5,603,025 A | 2/1997 | Tabb | |

(Continued)

FOREIGN PATENT DOCUMENTS

DE 19731293 1/1999

(Continued)

OTHER PUBLICATIONS

Business Week, "A Potent New Tool For Selling Database", printed Sep. 5, 1994, pp. 56-62.
Clark, Microsoft, Visa to Jointly Develop PC Electronic-Shopping Software, The Wall Street Journal, B9, Nov. 9, 1994, 3 pages.
CORBA Overview, May 25, 1999, 14 pages.
Cross-platform integration with XML and SOAP, Chester, Oct. 2001.
eCharge, eCharge Corporation, www.echarge.com, Dec. 3, 1999, 12 pages.

(Continued)

*Primary Examiner*—Thanh T Vu
(74) *Attorney, Agent, or Firm*—Goodwin Procter LLP

(57) ABSTRACT

An automated method for generating Graphical User Interfaces (GUI's) is illustrated in the context of a system for processing financial applications. In one embodiment, the GUI generator converts domain data representing over one thousand application types into an equal number of corresponding user screens. The interface may also be bidirectional, operating on user inputs to validate data or check for double keying.

12 Claims, 4 Drawing Sheets

U.S. PATENT DOCUMENTS

| | | | |
|---|---|---|---|
| 5,640,577 | A | 6/1997 | Scharmer |
| 5,642,419 | A | 6/1997 | Rosen |
| 5,666,493 | A | 9/1997 | Wojcik et al. |
| 5,671,285 | A | 9/1997 | Newman |
| 5,675,637 | A | 10/1997 | Szlam et al. |
| 5,678,046 | A | 10/1997 | Cahill et al. |
| 5,682,524 | A | 10/1997 | Freund |
| 5,692,132 | A | 11/1997 | Hogan |
| 5,715,402 | A | 2/1998 | Popolo |
| 5,715,450 | A | 2/1998 | Ambrose |
| 5,754,840 | A | 5/1998 | Rivette |
| 5,758,126 | A | 5/1998 | Daniels et al. |
| 5,761,288 | A | 6/1998 | Gray |
| 5,764,789 | A | 6/1998 | Pare et al. |
| 5,765,143 | A | 6/1998 | Sheldon |
| 5,805,719 | A | 9/1998 | Pare et al. |
| 5,828,734 | A | 10/1998 | Katz |
| 5,828,812 | A | 10/1998 | Khan |
| 5,835,087 | A | 11/1998 | Herz |
| 5,848,143 | A | 12/1998 | Andrews |
| 5,848,400 | A | 12/1998 | Chang |
| 5,870,725 | A | 2/1999 | Belinger et al. |
| 5,878,403 | A * | 3/1999 | DeFrancesco et al. .......... 705/38 |
| 5,903,881 | A | 5/1999 | Schrader |
| 5,910,988 | A | 6/1999 | Bailard |
| 5,952,639 | A | 9/1999 | Ohki et al. |
| 5,961,593 | A | 10/1999 | Gabber et al. |
| 5,963,635 | A | 10/1999 | Szlam et al. |
| 5,963,925 | A | 10/1999 | Kolling et al. |
| 5,966,695 | A | 10/1999 | Melchione et al. |
| 6,006,249 | A | 12/1999 | Leong |
| 6,009,442 | A | 12/1999 | Chen et al. |
| 6,016,810 | A | 1/2000 | Ravenscroft |
| 6,045,039 | A | 4/2000 | Stinson et al. |
| 6,065,675 | A | 5/2000 | Teicher |
| 6,070,147 | A | 5/2000 | Harms et al. |
| 6,070,244 | A | 5/2000 | Orchier et al. |
| 6,073,105 | A | 6/2000 | Sutcliffee et al. |
| 6,073,113 | A | 6/2000 | Guinan |
| 6,076,072 | A | 6/2000 | Libman |
| 6,081,790 | A | 6/2000 | Rosen |
| 6,085,168 | A | 7/2000 | Mori et al. |
| 6,091,817 | A | 7/2000 | Bertina et al. |
| 6,095,412 | A | 8/2000 | Bertina et al. |
| 6,101,486 | A | 8/2000 | Roberts et al. |
| 6,104,716 | A | 8/2000 | Crichton et al. |
| 6,111,858 | A | 8/2000 | Greaves et al. |
| 6,115,690 | A | 9/2000 | Wong |
| 6,128,602 | A | 10/2000 | Northington et al. |
| 6,138,118 | A | 10/2000 | Koppstein et al. |
| 6,144,946 | A | 11/2000 | Iwamura |
| 6,145,086 | A | 11/2000 | Bellemore |
| 6,151,584 | A | 11/2000 | Papierniak et al. |
| 6,154,750 | A | 11/2000 | Roberge et al. |
| 6,154,879 | A | 11/2000 | Pare et al. |
| 6,161,182 | A | 12/2000 | Nadooshan |
| 6,182,052 | B1 | 1/2001 | Fulton et al. |
| 6,199,077 | B1 | 3/2001 | Inala et al. |
| 6,202,005 | B1 | 3/2001 | Mahaffey |
| 6,202,054 | B1 | 3/2001 | Lawlor et al. |
| 6,202,151 | B1 | 3/2001 | Musgrave et al. |
| 6,226,623 | B1 | 5/2001 | Schein et al. |
| 6,227,447 | B1 | 5/2001 | Campisano |
| 6,230,148 | B1 | 5/2001 | Pare et al. |
| 6,266,683 | B1 | 7/2001 | Yehuda et al. |
| 6,269,348 | B1 | 7/2001 | Pare et al. |
| 6,298,356 | B1 | 10/2001 | Jawahar et al. |
| 6,301,567 | B1 | 10/2001 | Leong et al. |
| 6,308,274 | B1 | 10/2001 | Swift |
| 6,327,578 | B1 | 12/2001 | Linehan |
| 6,349,242 | B2 | 2/2002 | Mahaffey |
| 6,385,594 | B1 * | 5/2002 | Lebda et al. .................. 705/38 |
| 6,418,457 | B1 | 7/2002 | Schmidt et al. |
| 6,438,594 | B1 | 8/2002 | Bowman-Amuah |
| 6,493,677 | B1 | 12/2002 | Von Rosen et al. |
| 6,493,685 | B1 | 12/2002 | Ensel et al. |
| 6,510,523 | B1 | 1/2003 | Perlman |
| 6,532,284 | B2 | 3/2003 | Walker et al. |
| 6,535,855 | B1 | 3/2003 | Cahill et al. |
| 6,535,980 | B1 | 3/2003 | Kumar |
| 6,557,039 | B1 | 4/2003 | Leong |
| 6,609,113 | B1 | 8/2003 | O'Leary et al. |
| 6,609,125 | B1 | 8/2003 | Layne et al. |
| 6,618,579 | B1 | 9/2003 | Smith et al. |
| 6,623,415 | B2 | 9/2003 | Gates et al. |
| 6,772,146 | B2 | 8/2004 | Khemlani et al. |
| 7,072,450 | B1 * | 7/2006 | Pinard ..................... 379/88.11 |
| 2002/0018585 | A1 | 2/2002 | Kim |
| 2002/0019938 | A1 | 2/2002 | Aarons |
| 2002/0059141 | A1 | 5/2002 | Davies et al. |
| 2002/0077978 | A1 | 6/2002 | O'Leary et al. |
| 2002/0107788 | A1 | 8/2002 | Cunningham |
| 2003/0018915 | A1 | 1/2003 | Stoll |
| 2003/0041031 | A1 * | 2/2003 | Hedy ......................... 705/51 |
| 2003/0084647 | A1 | 5/2003 | Smith et al. |
| 2003/0088552 | A1 | 5/2003 | Bennett et al. |
| 2003/0115160 | A1 | 6/2003 | Nowlin et al. |
| 2003/0119642 | A1 | 6/2003 | Gates et al. |
| 2003/0154403 | A1 | 8/2003 | Kiensley |
| 2003/0177067 | A1 | 9/2003 | Cowell et al. |

FOREIGN PATENT DOCUMENTS

| | | |
|---|---|---|
| EP | 0 559 313 A1 | 9/1993 |
| EP | 0884877 | 12/1998 |
| EP | 0 917 119 A2 | 5/1999 |
| WO | WO 97/43736 | 11/1997 |
| WO | WO 99/52051 | 10/1999 |
| WO | WO 00/68858 | 11/2000 |
| WO | WO 01/35355 | 5/2001 |
| WO | WO 01/43084 | 6/2001 |

OTHER PUBLICATIONS

Fujimura et al., XML Voucher: Generic Voucher Language, Internet Draft, Trade Working Group, www.ietf.org, Feb. 2003.

Friedman, Jack P. Ph.D., CPA, Dictionary of Business Terms, Third Edition, Copyright 2000 by Barron's Educational Series, Inc. Prior editions © 1987, 1994 by Barron's Educational Series, Inc.

Houlder, OFT Gives the Individual Top Priority: Report Calls for Deregulation of Business Lending, The Financial Times, Jun. 8, 1994, 1 page.

Jonathan Berry et al., Cover Story, A Potent New Tool For Selling Database, Business Week, Sep. 5, 1994, pp. 56-62.

OMG, Welcome to OMG's CORBA for Beginners Page!, www.omg.com, May 25, 1999, 4 pages.

OMG, What is CORBA?, www.omg.com, May 25, 1999, 2 pages.

Pletz et al., Summary of the at your risk architecture, Jun. 3, 1999, 8 pages.

Post, E-Cash: Can't Live With It, Can't Live Without It, The American Lawyer, pp. 116-117, Mar. 1, 1996.

Secure and lightweight advertising on the web, Markus Jakobsson et al., Computer Networks, 31 (1999), 1101-1109.

Shibata, Seventh International Conference on Parallel and Distributed Systems: Workshops, IEEE Computer Society, Jul. 4-7, 2000.

Sirbu et al., NetBill: An Internet Commerce System Optimized for Network Delivered Services, http://www.ini.cmu.edu:80/netbill, pp. 1-12, Feb. 27, 1995, 12 pages.

The Source For Java Technology, Applets, May 21, 1999, 2 pages.

The Source For Java™ Technology, java.sun.com, "Applets", May 21, 1999.

* cited by examiner

SYSTEM AND METHOD FOR PROCESSING APPLICANT INPUT INFORMATION

CROSS-REFERENCE TO RELATED APPLICATIONS

This application is a continuation of U.S. application Ser. No. 09/597,298 filed Jun. 20, 2000, now U.S. Pat. No. 6,867,789 entitled "System and Method for Generating Graphical User Interfaces".

The subject matter of this application is related to the subject matter of U.S. patent application Ser. No. 09/597,299 entitled "SYSTEM AND METHOD FOR PROCESSING APPLICATIONS FOR FINANCIAL SERVICES" filed of even date herewith, which application is assigned or under obligation of assignment to the same assignee as this application and which is incorporated by reference herein. The subject matter of this application is also related to the subject matter of provisional U.S. Patent Application Ser. No. 60/182,674 filed Feb. 15, 2000 entitled "SYSTEM AND METHOD FOR PROCESSING AND TRACKING APPLICATIONS FOR FINANCIAL PRODUCTS AND SERVICES," which application is assigned or under obligation of assignment to the same assignee as this application and which is incorporated by reference herein, and priority being claimed therefrom.

FIELD OF THE INVENTION

The invention described herein is for the automated generation of graphical user interfaces (GUI's).

BACKGROUND OF THE INVENTION

Present-day consumers have come to rely on the convenience of credit cards and other financial services. There is a high volume of new account applications for such services, even in the credit card industry, for example, where there is already a large base of existing credit card holders. Several factors may account for the high volume of credit card applications: consumers who have recently reached the age of majority are applying for their first credit card; existing credit card users often change from one credit service provider to another in order to obtain more favorable terms; and some credit card holders desire additional or upgraded credit cards.

The financial services industry is competitive. Banks and other financial service providers therefore may review a large number of applications in a limited amount of time, and they must make good decisions regarding the credit-worthiness of potential borrowers. Automated systems have been developed to process applications quickly and to track individual credit applications through the review process. Many application processing systems manage risk by employing a decision engine to consistently apply best business practices associated with the selection of customers.

Known systems and methods for processing high volumes of credit applications receive data from a single input channel, operate either in batch mode or in real-time mode, make credit decisions using a single decision engine, and customize user interfaces for different application types. Drawbacks of such implementations are considered below.

Credit applications typically include information such as name and address of the applicant(s), and may include information such as employment history, monthly income, monthly financial obligations, and the amount of credit being applied for. Potential customers submit credit applications to banks or other financial institutions through various channels.

A drawback of existing application processing systems is that they are typically configured to accept applications from a single channel, for example paper applications received in the mail, applications submitted via the Internet, or applications received over the phone. Moreover, application processing systems may operate in a mode that is tailored to the type of input channel. For example, systems that process paper applications typically process in batch mode, whereas an interactive Internet application requires real time processing. It is inefficient for financial institutions to implement and maintain separate systems for processing applications that are submitted through different channels. On the other hand, it is a convenience to applicants, and thus a benefit to financial service providers, to offer a variety of application input alternatives.

Credit decisions are often made on the basis of information from the credit application itself, and from historical credit information provided by one or more independent credit bureaus. Decision engines typically include software implementations of algorithms designed to quantify risk based on such information, resulting in a determination as to whether credit should be offered to a particular applicant, and, if so, under what terms. Such algorithms are constantly evolving. As a consequence, application processing systems tailored to a particular decision engine may quickly become obsolete.

Additionally, many data processing systems, including those that process applications for financial services, are required to accommodate a variety of different user interface screens. A financial service provider may, for example, have hundreds of different new account application formats related to the variety of services it offers to consumers. System developers respond to this need by coding or scripting a variety of user interfaces that are tailored to the requirements of each application. Unfortunately, user interface requirements may be dynamic for many data processing operations. A financial services provider, for example, may wish to offer new services, may require new information to process existing products, or may simply change the layout of a user interface to make it more user-friendly. The result can be a high level of maintenance in the form of software support, which may be both costly and time-consuming.

Thus, existing application processing systems may have narrow operational value, and may require frequent modification. These and other drawbacks limit the efficiency of such systems.

SUMMARY OF THE INVENTION

The invention overcoming these and other drawbacks in the art relates a system and method that may accept applications for financial services from a variety of input channels, may operate in various processing modes, may utilize one or more decision engines during operation, and may generate user interface script automatically.

It is an object of the invention to make the process of applying for financial services more convenient for consumers. The techniques described herein for enabling a variety of input channels and for processing applications in a variety of modes may provide more data input options for applicants and may be a more efficient use of computing resources for financial institutions.

It is another object of the invention to provide financial institutions with a more powerful technique for automating credit decisions. A flexible interface to decision engines may be advantageous for several reasons. First, this type of interface may make multiple types of decision engines available simultaneously. This would be a benefit, for example, where different engines are used together to make decisions on different financial products, or where two or more decision engines are used to make a single determination. Moreover, a flexible interface may significantly reduce the cost of replacing decision engines in the overall system, when and if it becomes necessary.

It is another object of the invention to eliminate or reduce the amount of manual scripting required to support new user interfaces to data processing systems. By automatically generating user interface script based on functional parameters, it is no longer necessary to manually develop screen interfaces for the variety of applications that may be supported by any one system. This technique may be executed in situ (i.e., in the process of each user transaction), or it may be executed only once after a new application has been defined (in which case the resulting user interface script would be stored for later use).

In one embodiment of the invention, an applicant may communicate with the data processing system via the Internet. The applicant may further select a particular financial service from a menu of choices. In response, the script generator creates an appropriate user interface, which is presented to the user for completing and submitting an application for the selected financial service. The system processes the application data in a mode that is tailored to the input channel; here, it is likely that the system will operate in real time mode. The system may then select and employ one or more decision engines, as appropriate for the type of application that is to be processed. Once a determination has been made whether to perform financial services for the applicant, the data processing system notifies the applicant that their application has been either accepted or rejected.

The following drawings and descriptions further describe the invention, including several different embodiments of the major system components and processes. The construction of such a system, implementation of such a process, and advantages will be clear to a person skilled in the art of data processing generally, including financial services.

DETAILED DESCRIPTION OF THE INVENTION

Figure 1:
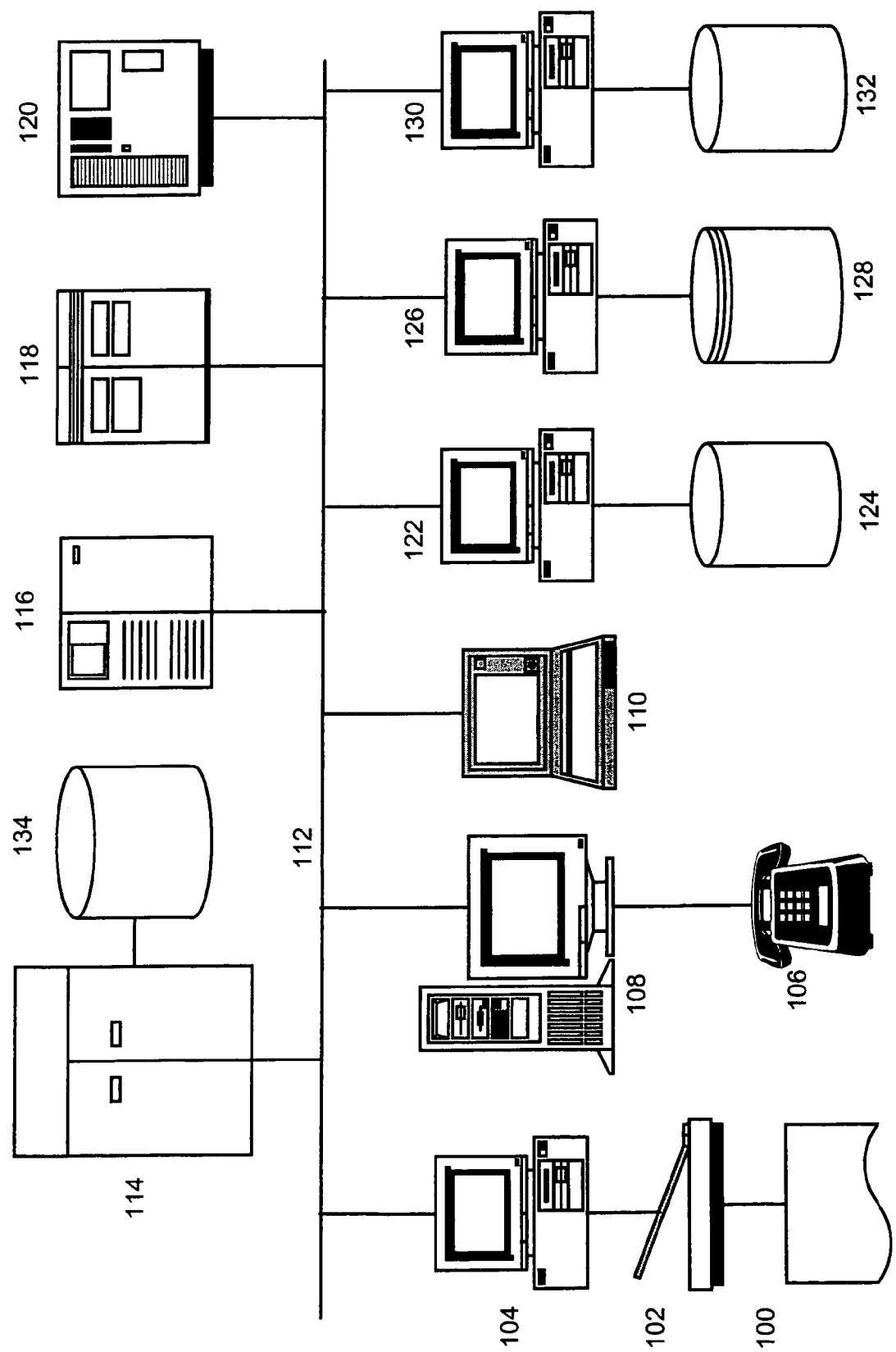
FIG. 1 is the schematic diagram of a system that processes applications for financial services, according to one embodiment of the invention.

FIG. 1 illustrates a system architecture for processing applications related to financial services according to the invention. A purpose of the system is to connect sources of electronic application data to decision engines and credit bureaus, and to host programs that coordinate the processing of application data. The schematic depicts among other possible resources: servers 114, 116, 118, 120, 122, 126 and 130; clients 104, 108, and 110; and databases 124, 128, 132 and 134. Servers and clients are connected via communication link 112, according to one embodiment of the invention.

Server 114 may perform or coordinate the processing of financial applications including functions such as data collection, validation, tracking, reconciliation, repair, routing, fulfillment, and reporting functions. Servers 116, 118, and 120 represent a variety of decision engines that such a system may include or interface to. Servers 122, 126 and 130 illustrate various credit bureau servers that the system may utilize to obtain credit history for a given applicant. Servers 114, 116, 118, 120, 122, 126 and 130 may be or include, for instance, a workstation running the Microsoft Windows™ NT™, Windows™ 2000, Unix, Linux, Xenix, IBM AIX, Hewlett-Packard UX, Novell Netware™, Sun Microsystems Solaris™, OS/2™, BeOS™, Mach, Apache, OpenStep™ or other operating system or platform.

Clients 104, 108, and 110 represent various sources for applications related to financial services. All provide applications to the processing system in electronic format. Client 104 depicts a source of electronic applications where paper documents 100 have been converted into electronic format by a scanner 102. Client 108 depicts a source for electronic applications originating via telephonic input 106. Client 110 depicts a direct user interface. Clients 104, 108, and 110 may be or include, for instance, a personal computer running the Microsoft Windows™ 95, 98, Millenium™, NT™, or 2000, Windows™CE™, PalmOS™, Unix, Linux, Solaris™, OS/2™, BeOS™, MacOS™ or other operating system or platform. Clients 104, 108, and 110 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Clients 104, 108, and 110 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art. Clients 104, 108, and 110 may also be or include a network-enabled appliance such as a WebTV™ unit, radio-enabled Palm™ Pilot or similar unit, a set-top box, a networkable game-playing console such as Sony Playstation™ or Sega Dreamcast™, a browser-equipped cellular telephone, or other TCP/IP client or other device.

Databases 124, 128 and 132 may include credit history data for applicants and non-applicants, as maintained by various credit bureaus. Database 134 may include application data, application status information, and programs used by the application processing system 114. Databases 124, 128, 132 and 134 may be, include or interface to, for example, the Oracle™ relational database sold commercially by Oracle Corp. Other databases, such as Informix™, DB2 (Database 2) or other data storage or query formats or platforms such as OLAP (On Line Analytical Processing), SQL (Standard Query Language), Microsoft Access™ or others may also be used, incorporated or accessed in the invention.

Communication link 112 connects servers 114, 116, 118, 120, 122, 126 and 130 to each other and to clients 104, 108, and 110. Communications link 112 may be, include or interface to any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34 bis analog modem connection, a cable modem, an ATM (Asynchronous Transfer Mode) connection, or FDDI (Fiber Distributed Data Interface) or CDDI (Copper Distributed Data Interface) connections. Communications link 112 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 112 may yet further be, include or interface to any one or more of an RS-232 serial connection, an IEEE-1394 (Firewire) connection, a Fibre Channel connection, an IrDA (infrared) port, a SCSI (Small Computer Serial Interface) connection, a USB (Universal Serial Bus) connection or other wired or wireless, digital or analog interface or connection.

Servers 114, 116, 118, 120, 122, 126, 130 and clients 104, 108, and 110 may utilize networked enabled code related to communication link 112. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Java™, Jini™, C, C++, Perl, UNIX Shell, Visual Basic or Visual Basic Script, Virtual Reality Markup Language (VRML) or other compilers, assemblers, interpreters or other computer languages or platforms.

Figure 2:
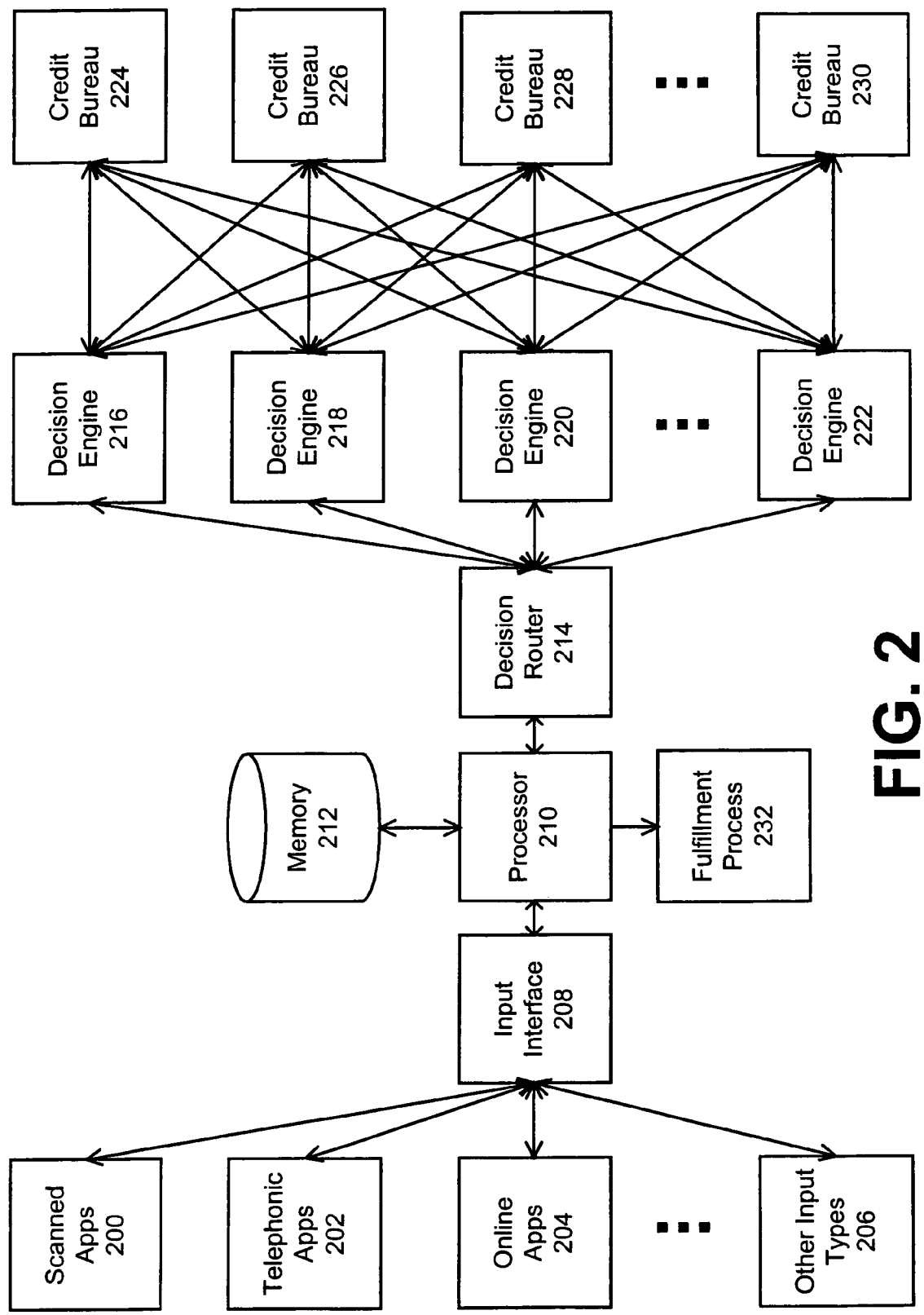
FIG. 2 is a flow diagram illustrating the logical relationship between functional components of a system that processes applications for financial services, according to one embodiment of the invention.

FIG. 2 is a flow diagram illustrating the logical relationship between functional components of a system that processes applications for financial services according to one embodiment of the invention. One purpose of the processes depicted in FIG. 2 is to make a decision, for each application, whether an offer should be made to an applicant for financial services such as a credit card account or a mortgage. The processes may also be used to establish terms of such an offer, for instance the maximum amount of money to be loaned, or the minimum interest rate to be charged.

Many of the functional elements in FIG. 2 can be related to components of the system architecture depicted in FIG. 1. For example, scanned applications 200 may reside on client 104; telephonic applications 202 may reside on client 108; and online applications 204 may be provided by client 110. Additionally, the functional elements in FIG. 2 identified as the input interface 208, processor 210, and decision router 214 may be executed on server 114. Memory 212 may correspond to database 130. Decision engines 216, 218, and 220 may be embodied in servers 116, 118, and 120. Credit bureaus 224, 226, and 228 may operate through servers 122, 126 and 130. Data source 206, decision engine 222, and credit bureau 230 are shown to indicate the expandability of the application processing method. The interface to fulfillment process 232 illustrates that a positive result from processing an application may be, for example, a downstream process that issues a credit card or provides some other consideration to the applicant. In another embodiment, fulfillment process 232 may interface more directly to decision engine 216, 218, 220, or 222.

Advantageously, input interface 208 is adapted to receive electronic application data from a variety of input sources and types, depicted in FIG. 2 as 200, 202, 204, and 206.

Processor 210 may perform or coordinate functions such as data collection, validation, tracking, repair, routing, fulfillment, and reporting. Data collection relates to application data received through interface 208. Validation may involve checking the application data received against a pre-defined set of criteria in order to identify data input or translation errors originating, for example, at sources 200, 202, 204, or 206. The repair function may be able to fix at least some of the errors types that are detected by the validation function. The routing function relates, for instance, to coordination of the decision router 214 described in more detail below. Processor 210 also may interface to or coordinate the passing of data to fulfillment process 232, for example in the case where a credit account is to be established or where a credit card is to be physically mailed to the customer of a bank or other financial institution.

Processor 210 may operate on the application data in either batch or real time mode. Batch mode may operate on a group of applications only at off-peak hours. Alternatively, batch mode may operate both during peak and off-peak hours to achieve workload leveling (in effect reducing or eliminating peak loads). Real time mode is required for interactive processing sessions, for example where an applicant is making application online and where a response is made to that applicant regarding an offer of financial services within seconds or minutes. Together, the flexible input interface 208 and selectable modes of processor 210 maximize the efficiency of server 114 and decision engines 216, 218, 220, and 222, and eliminate the need for dedicated application processing systems for different application data sources or types.

Decision router 214 performs at least three functions. First, it controls the routing of application data to decision engine(s) 216, 218, 220, and/or 222. Decision router 214 may select a single decision engine, for example where decision engines 216, 218, 220, and 222 are each tailored for different financial services and where the applicant has only applied for a single financial service. Decision router 214 may select two or more decision engines to process the application data simultaneously, for instance where the applicant has applied for more than one type of financial service. Such parallel processing may also be appropriate where the results of two or more decision engines are used to make a determination as to an offer for a single financial service. Decision router 214 may also select two or more decision engines to process the application data in serial fashion. This may be advantageous, for example, where the single financial service applied for was denied, but where the financial institution wishes to consider other financial services that it might offer to the applicant. Additionally, two or more decision engines may be selected for serial operation where the results of one decision engine can be used in subsequent calculations by another decision engine. Better decisions regarding offers for financial services may result from the ability to select and employ one or more decision engines during application processing.

A second function of decision router 214 is to provide formatting of the application data as required by each type of decision engine. In general, different developers may have coded decision engines 216, 218, 220, and 222, and they may have done so at different times. It is therefore unlikely that the required formats for the application data that they process are consistent. Decision router 214 may therefore utilize a library of decision engine proxies to format application data received from input sources 200, 202, 204, or 206 into the appropriate format for decision engines 216, 218, 220, and/or 222. The flexibility of this interface allows those who maintain the application processing system to readily connect to new or different decision engines. This may result in substantial time and cost savings.

A third function performed by decision router 214 is to receive the decisions reached by decision engines 216, 218, 220, and/or 222 and route them to other decision engines or to processor 210, as appropriate.

FIG. 2 also illustrates that decision engines 216, 218, 220, and 222 may each obtain historical credit information from one or more credit bureaus 224, 226, 228 and 230 that is considered together with application data from input sources 200, 202, 204, and 206 in making credit or other decisions. The decision engines, 216, 218, 220 and 222 may include, for example, the commercial Magnum™, ACAPS™, First-Class™ or other engine or service.

Figure 3:
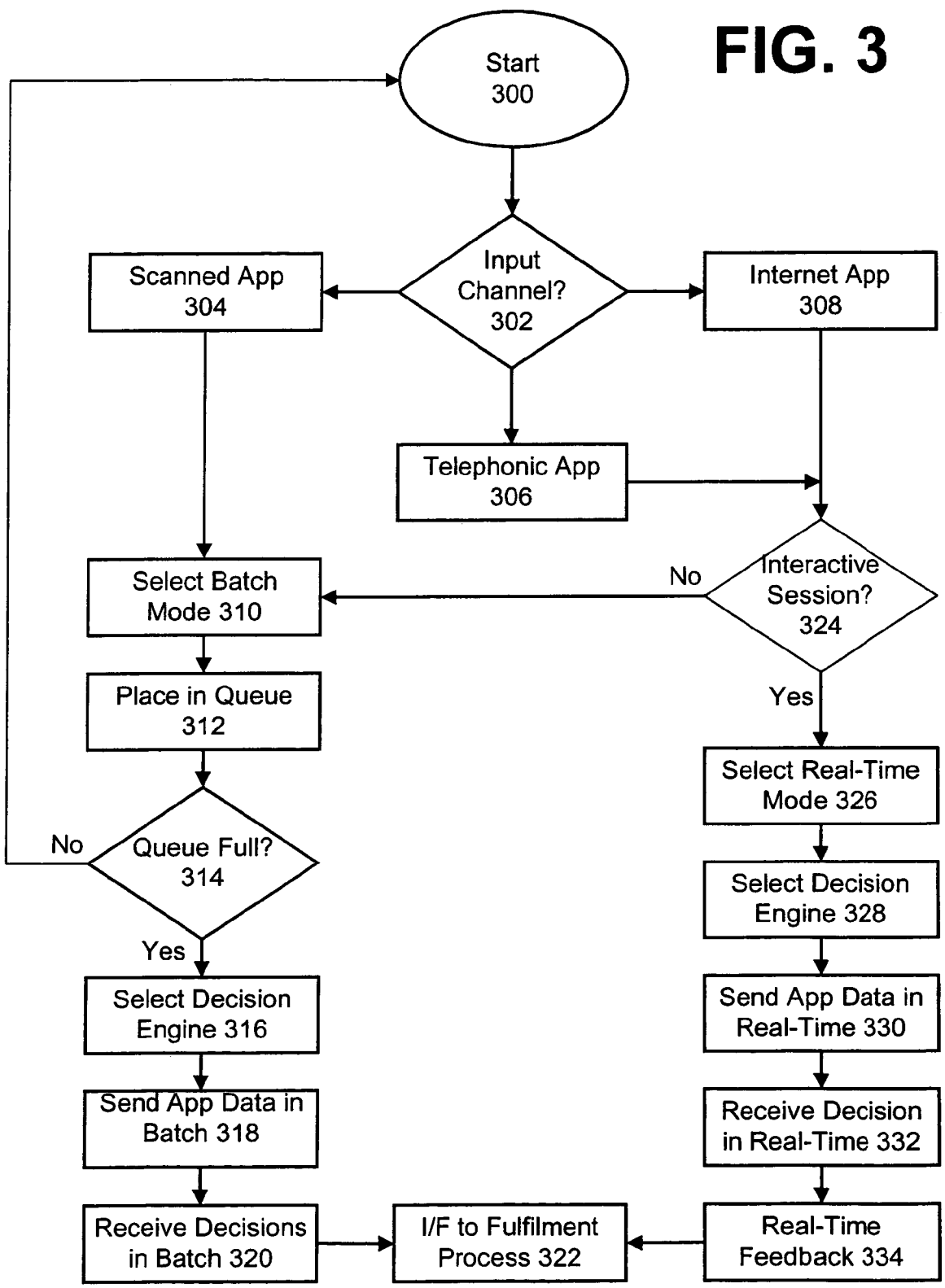
FIG. 3 is a flow diagram illustrating a method for processing applications related to financial services, according to one embodiment of the invention.

FIG. 3 is a flow diagram illustrating a method for processing applications related to financial services according to one embodiment of the invention. The diagram demonstrates that after an appropriate start 300, typically the receipt of application data, the processor must determine the input channel 302 from which the data came. If the data originated with a scanned paper application 304 or other non-interactive session 324, then batch mode is selected 310. Batch mode may function by placing data in a queue 312 until the queue becomes full 314 or until the processor determines that the decision engines have sufficient processing capacity (as with the load leveling technique described above). Thereafter, one or more decision engines are selected 316, and all applications in the batch are sent 318 to the decision engine(s). After decisions are received 320, positive results are sent to the fulfillment process 322.

FIG. 3 also illustrates that data from telephonic applications 306 or Internet applications 308 that are part of an interactive session 324 are selected 326 for real time processing. In real time mode, one or more decision engines must also be selected 328 before applicant data is sent 330 to the decision engines. In contrast to the batch mode, however, once results are returned 332, notification is made to the applicant in real time 334 before initiating the interface to the fulfillment process 322.

The dual mode capability illustrated by FIG. 3 provides an advantage for financial entities: separate systems for batch and real time processing of financial applications are not required. This may result in lower operating and support costs.

In an another embodiment of the process shown in FIG. 3, both alternatives operate in real time mode. In this instance, the only difference between alternative flows may be that one processing path provides for real-time feedback (process-and-notify) whereas the other does not (process).

Figure 4:
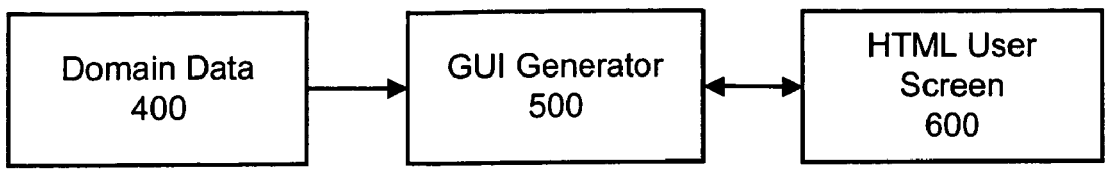
FIG. 4 is a flow diagram illustrating the inputs and outputs of an automated Graphical User Interface (GUI) generator, which has been adapted for mediating communication between an application processing system and an applicant.

FIG. 4 is a flow diagram illustrating the inputs and outputs of an automated Graphical User Interface (GUI) generator 500, which has been adapted for mediating communication between an application processing system and an applicant. The initial input is represented by domain data 400. Domain data 400 may include, for example, the name of an applicant and the location on the application that the name is to be found. Domain data 400 may similarly include the description and location of the applicant's address, present employer, or other information. Domain data 400 may be generated manually, for example by key entry, or it may be automated, as in the case of document scanning and character recognition. Generation of domain data 400 may further involve automatic conversion from a flat file format to XML format. The output of GUI generator 500 may be a User screen 600 that has been tailored for collecting and displaying information relevant to one or more financial services. There may be hundreds or even thousands of different embodiments of user screen 600. Automated generation of the user interface eliminates the time and expense that would otherwise be associated with manual code generation.

User screen 600 may further have a spatial correspondence to the variety of paper applications that it relates to. This may be an advantage, for example, where an agent of the financial entity processing the application is comparing the electronic version of application data to an original paper copy of the application. Where a user adds data to user screen 600, data from that screen may then become another input to GUI Generator.

Figure 5:
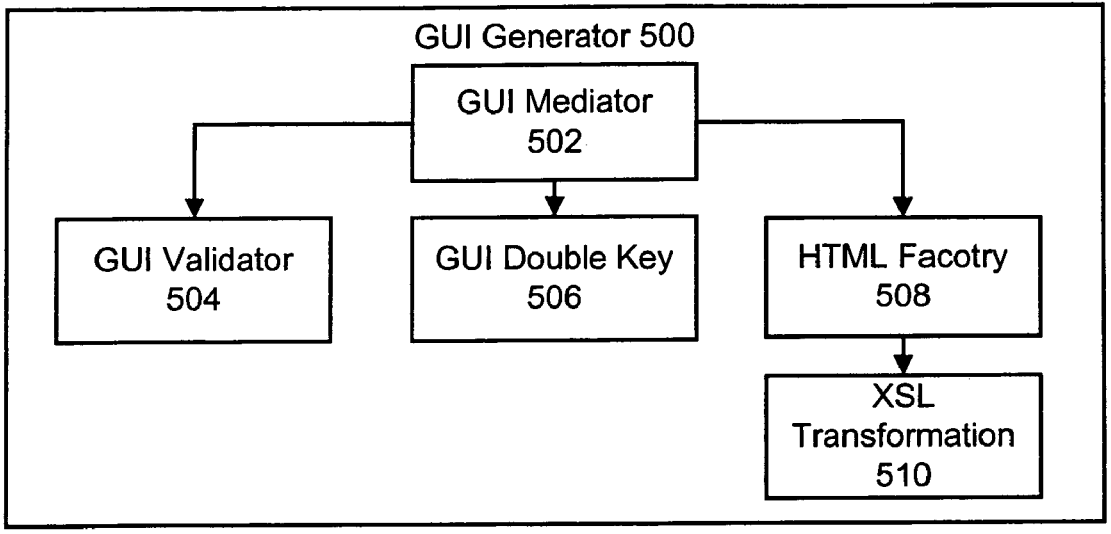
FIG. 5 is a flow diagram illustrating a method for mediating communication between a system and a user, according to one embodiment of the invention.

FIG. 5 is a flow diagram illustrating a method for mediating communication between a system and a user, according to one embodiment of the invention. All processes shown may be implemented via application software included in input interface 208, and may reside on server 114. In the instance where GUI generator 500 is to display a user screen 600 based on domain data 400, the GUI mediator 502 calls HTML factory 508 and utilizes XSL transformation 510 to convert XML formatted domain data 400 into an HTML user screen 600. In the instance where GUI generator 500 is to receive data that is input on user screen 600, GUI mediator 502 may validate the input data using GUI validator 504 and/or GUI double key checking 506.

GUI validator 504 may use a rules engine to perform a validation on the data entered by the user in step 600. Such rules may be encoded in a database using Java-like syntax, and may be loaded on instantiation of the service. GUI validator 504 may be implemented according to the JavaCC rules engine.

The GUI double key checking process 506 may be responsible for scanning the XML document to determine, for example, which fields need to be double keyed. In one embodiment, all double keyed fields may be cleared of text and returned to the user for re-keying. The original values may be stored in the document. If the re-key and the original input match, the document may be forwarded.

Figure 6:
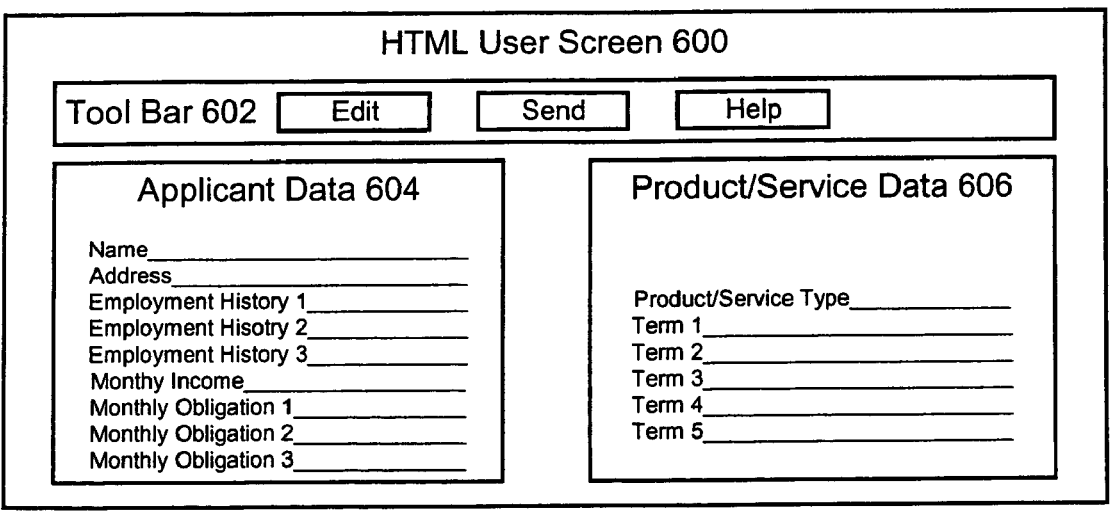
FIG. 6 is the schematic of a user screen resulting from operation of an automated Graphical User Interface (GUI) generator, according to one embodiment of the invention.

FIG. 6 is the schematic of a user screen resulting from operation of an automated Graphical User Interface (GUI) generator, according to one embodiment of the invention. The notional schematic illustrates that a user screen 600 may include a tool bar 602, drop down menu, or similar technique for selecting user functions. User screen 600 may also include data fields for collecting or correcting applicant data 604, or for defining, selecting, or viewing information about financial services that may be offered to the applicant 606.

The specification and examples provided above should be considered exemplary only. It is contemplated that the appended claims will cover any other such embodiments or modifications as fall within the true scope of the invention.

What is claimed is:

1. A computer-implemented system for processing applicant input information for use in receiving an application for one or more financial services products, the system comprising:

two or more decision engines, each decision engine including decision functionality for rendering a decision associated with at least one predetermined financial product and each decision engine accepting the applicant input information in a corresponding required format; and an application processing server comprising;
    an input interface for receiving the applicant input information in one of multiple available input formats over one of multiple distinct input channels,
    a processor for determining the input channel and collecting the applicant input information, and
    one or more decision engine routers operating in conjunction with the processor for collecting the received applicant input information from the input interface;
the one or more decision engine routers including formatting functionality for selecting the corresponding required format from a plurality of available formats stored in a library of decision engine proxies and for converting the applicant input information into application data according to the corresponding required format for each decision engine;
the one or more decision engine routers for routing the application data to one more selected decision engines to process the application data, each decision engine router including routing functionality for automatically selecting the one or more selected decision engines based on the applicant input information and the at least one predetermined financial product associated with the selected decision engine;
wherein (1) the one or more decision engine routers route the application data so that an application can be processed by multiple decision engines in parallel; or (2) the one or more decision engines route the application data so that an application can be processed by multiple decision engines in series.

2. The system of claim 1, wherein the one or more decision engine routers route the application data so that an application can be processed by multiple decision engines in series, wherein the one or more decision engine routers receive information regarding the decisions reached by a first decision engine and route the information regarding the decisions reached by the first decision engine to a second decision engine.

3. The system of claim 1, wherein the one or more decision engine routers select batch mode processing for certain applications, and real-time processing for certain other applications.

4. The system of claim 1, wherein the decision engines may each have inputs from other outside information sources in addition to the applicant input information.

5. The system of claim 1, wherein the two or more decision engines are adapted to process applications corresponding to a plurality of financial services products.

6. The system of claim 1, wherein the plurality of financial services products includes credit card products and mortgage products.

7. A computer-implemented system for processing applicant input information for use in receiving an application for one or more financial services products, the system comprising:
    two or more decision engines, each decision engine including decision functionality for rendering a decision associated with at least one predetermined financial product and each decision engine accepting the applicant input information in a corresponding required format; and
    an application processing server comprising;
        an input interface for receiving the applicant input information in one of multiple available input formats over one of multiple distinct input channels,
        a processor for determining the input channel and collecting the applicant input information, and
        one or more decision engine routers operating in conjunction with the processor for collecting the received applicant input information from the input interface;
    the one or more decision engine routers including formatting functionality for selecting the corresponding required format from a plurality of available formats stored in a library of decision engine proxies and for converting the applicant input information into application data according to the corresponding required format for each decision engine;
    the one or more decision engine routers for routing the application data to one more selected decision engines to process the application data, each decision engine router including routing functionality for automatically selecting the one or more selected decision engines based on the applicant input information and the at least one predetermined financial product associated with the selected decision engine;
    wherein the one or more decision engine routers route the application data so that an application is processed by multiple decision engines in parallel.

8. The system of claim 7, wherein the one or more decision engine routers process applications in batch mode based on the input channel determined by the processor.

9. The system of claim 7, wherein the one or more decision engine routers process applications in real-time based on the input channel determined by the processor.

10. A computer-implemented method for processing applicant input information for use in receiving an application for financial services products, comprising:
    receiving, over an input channel, at a processor implementing a decision engine router, a financial services product application from an applicant, the processor and decision engine router processing the financial services product application by:
        determining the input channel, wherein each input channel has a corresponding input format;
        selecting a processor operating mode based upon the input channel, wherein the operating mode is one of batch mode and real time mode;
        selecting a plurality of decision engines to individually process the financial services product application, wherein the selection is accomplished by considering the financial services product applied for by the applicant and a particular functionality of each selected decision engine;
        selecting a required format from a plurality of available formats, each available format corresponding to at least one of the plurality of decision engines, and converting the received input applicant information from the input format into the financial services product application according to a set of formatting and submission requirements for each of the plurality of decision engines;
        determining a submission order based upon whether the formatted financial services product applications are to be routed to the plurality of decision engines in series or in parallel;
        routing the formatted financial services product applications to each of the plurality of decision engines based upon the submission order.

11. The method of claim 10, wherein the submission order is based upon routing the formatted financial services product applications to the plurality of decision engines in series and further comprising:
receiving, at the decision engine router, information regarding the decisions reached by a first decision engine; and
routing the information regarding the decisions reached by the first decision engine to subsequent decision engines.

12. The method of claim 10, wherein the submission order is based upon routing the formatted financial services product applications to the plurality of decision engines in parallel and wherein the decision engine router processes the financial services product application in real-time.

* * * * *